June 10, 1947.   E. D. BLODGETT   2,422,072
RADIO COMPASS
Filed Feb. 15, 1943

Inventor
Edward D. Blodgett
By
Attorney

Patented June 10, 1947

2,422,072

UNITED STATES PATENT OFFICE 2,422,072

RADIO COMPASS

Edward D. Blodgett, Haddonfield, N. J., assignor to Radio Corporation of America, a corporation of Delaware Application February 15, 1943, Serial No. 475,858

8 Claims. (Cl. 250—11)

This invention relates to radio direction finding and more particularly to the conversion of a radio direction finder to provide visual left-right course indications, for "homing," or traveling along a predetermined course.

An aural null type of direction finder fitted with means for determining bi-lateral and uni-lateral bearings is a common installation on aircraft. Such aircraft direction finders comprise a rotatable loop, a radio receiver and an output indicating device which may be a meter or headphones. To determine the bearing of a radio transmitter with such equipment the loop is rotated to a position such that minimum output is provided by the receiver. The axis of the loop is then directed along the line between the transmitter and the receiver and the azimuth angle is indicated by an index mechanically connected to the loop. The directive pattern of the loop antenna is a figure-of-eight which provides two minima in the receiver output as the loop is rotated. To resolve the ambiguity of the reciprocal bearing produced by this effect, a non-directive antenna is usually provided, and the outputs of the loop and non-directive antennas are combined to provide a cardioid directive pattern. The single minimum of this pattern is directed along the plane of the loop in one direction or the other from the center depending upon the polarity in which the loop is connected to the receiver.

It is the principal object of the present invention to provide an improved means for converting a direction finder of the above described type so as to produce visual left-right course indications.

Another object is to provide an improved means for converting existing direction finders into left-right indicators without the necessity of altering the original installation.

A further object is to provide an improved method of and means for such conversion, involving the addition of a minimum quantity of apparatus. These and other and incidental objects will become apparent to those skilled in the art upon consideration of the following description, with reference to the accompanying drawing, of which Fig. 1 is a schematic diagram of a direction finder embodying the invention; Fig. 2 is a graph of the cycle of operation of one of the switches in the system of Fig. 1; Fig. 3 is a graphical representation of the rectified output of the radio receiver of Fig. 1, and Fig. 4 is a graphical representation of the voltages applied to the indicator of the system of Fig. 1.

Referring to Fig. 1, a loop antenna 1 is connected through a reversing switch 3 to a radio receiver 5. A non-directive antenna 7 is also connected to the receiver 5. The receiver 5 is of the conventional super-heterodyne type and, together with the antennas 1 and 7, may be part of a previously installed direction finder system.

A beat oscillator 9 is coupled to the I.-F. amplifier of the receiver 5. The output circuit of the receiver 5 is connected to a rectifier 11. The output circuit of the rectifier 11 is applied through a single pole double throw switch 13 to a meter 15. A pair of capacitors 19 and 21 are connected across the meter 15, and the return circuit of the rectifier 11 is connected to their common junction. A capacitor 22 is connected across the meter to smooth out fluctuations in the voltage across the meter and to provide damping. The switches 3 and 13 are arranged to be operated in synchronism by a motor 17, which is connected through a switch 14 to the receiver power source, not shown. A switch 4 is ganged with the switch 14 and arranged to connect the loop 1 directly to the receiver input when the motor 17 is deenergized. Thus the loop is always connected in the same polarity when the motor switch is off.

Referring to Fig. 2, the cycle of operation of the switch 3 is such that during the periods P1 the loop is connected to the receiver in a polarity arbitrarily designated as positive. During the periods P2 the loop is connected to the receiver in the opposite, or negative polarity. The rate of operation of the switches 3 and 13 is approximately 10 cycles per second. Since this frequency is well below the low frequency cut off of the output or audio channel of the standard aircraft receiver, it is necessary to provide other modulation at a higher frequency. The beat oscillator 9 is tuned to a frequency differing from that of the I.-F. frequency of the receiver 5 by, for example, 1000 cycles, or frequency corresponding approximately to the mid-frequency of the audio or output response characteristic of the receiver. The output of the receiver 5 will then comprise trains of 1000 cycle waves, alternating in amplitude at a rate of 10 times per second between values corresponding to the carrier amplitudes applied to the receiver 5 as the loop is reversed. The receiver output is rectified by the rectifier 11, providing D.-C. voltages corresponding in amplitude.

Referring to Fig. 3, assuming that the loop 1 is off course to the left, the voltage from the rectifier 11 during the period P1 will be of greater amplitude than that produced during the period P2. In each case, transients are induced at the beginning of the period by the operation of the switch 3, as indicated at A. The switch 13 connects the output of the rectifier 11 to the capacitor 19 during the periods P1, and to the capacitor 21 during the periods P2. The mechanical connection between the switches 3 and 13 is such that the switch 13 closes at a time T after the closure of the switch 3. Thus the voltage applied to the capacitor 19 is of the form shown at L in Fig. 4, and the voltage applied to the capacitor 21 is of the form shown at R in Fig. 4. The capacitors 19 and 21 are charged to corresponding voltages. These voltages are applied in opposition to each other to the meter 15. When the condensers 19 and 21 are charged to equal voltages, no current flows through the meter. When the two voltages are unequal, as under the conditions illustrated in Fig. 4, an equalizing current flows through the meter 15, causing a deflection to the left. Similarly when the axis of the loop is to the right of the course line, the meter 15 is deflected to the right.

If copper oxide contact rectifier elements are used for the rectifier 11 of Fig. 1, it is found that operation is unsatisfactory at low temperatures. This is remedied by enclosing the rectifier in a heat insulated box 8 with a heating element 10 and a thermostatically controlled switch 12. The heater is connected to the motor 17 so that the temperature of the rectifier is maintained at the proper level during operation of the system.

Since the antenna switching is done in the loop circuit, rather than in the circuit of the non-directive antenna, modulation of the carrier, when the loop is on course, is avoided. The transient caused by the closure of the switch 3 is of the same duration regardless of the switching rate. Hence the switching rate is made very slow, so that the transient period is a small fraction of each switching cycle. This has the additional advantage of producing a minimum audio interference when the operator is listening to or monitoring the received signal.

Prior art radio compasses of the left-right indicator type require that the audio frequency system of the receiver be designed to pass the loop modulation, or switching frequency. If all of the advantages of low frequency switching were to be retained, it would be necessary to provide unusually large transformers or other coupling devices in the audio channel. This is avoided in the present invention by the use of the beat frequency oscillator, which beats with the incoming signal frequency to provide currents of the required frequency.

Thus the invention has been described as an improved method of and means for converting a conventional direction finder of the type used on board aircraft to provide visual course indication. The originally installed equipment is left unaltered and a conversion unit comprising motor driven switches, a rectifier, and an indicator is connected thereto. The switching operation is performed in the loop or directional, rather than the nondirectional circuit, to eliminate modulation of the received carier when "on-course," i. e., with the loop in the null position. The switching operation is performed at a low frequency rate which in effect reduces the total amount of contact noise over a given time interval. Since the contact noise is of fixed duration, regardless of switching speed, the low frequency switch rate provides the maximum usable time interval during which output voltage may be applied to the indicator.

I claim as my invention:

1. A radio direction finder converter of the left-right indicator type comprising a loop antenna, a radio receiver including audio amplifier means having a response characteristic extending over a predetermined frequency range, with a predetermined low cutoff frequency, a reversing switch connected to said loop and to the input circuit of said radio receiver, a beat frequency oscillator connected to said receiver, a rectifier connected to the output circuit of said receiver, a second reversing switch connected to the output circuit of said rectifier, an indicator connected to said second switch and a motor arranged to operate said switches in synchronism at a frequency lower than said cutoff frequency.

2. The invention as claimed in claim 1, wherein said second reversing switch is arranged to close subsequent to the transient caused by the closure of said first reversing switch.

3. The invention as claimed in claim 1 wherein said receiver is of the superheterodyne type, having a predetermined I.-F. frequency, and said beat frequency oscillator is arranged to operate at a frequency differing from said I.-F. frequency of said receiver by a frequency approximately equal to the mid-frequency of said audio response characteristic of said receiver.

4. The invention as claimed in claim 1 wherein said receiver is of the superheterodyne type, having a predetermined I.-F. frequency, and said reversing switches are operated at a frequency of approximately 10 cycles per second and said beat oscillator operates at a frequency differing from said I.-F. frequency of said receiver by approximately 1000 cycles per second.

5. The invention as claimed in claim 1 wherein the circuit of said indicator includes a pair of capacitors connected to said second reversing switch so as to be charged separately and alternately, and a D.-C. meter connected to said capacitors so as to provide a path for the flow of current to equalize the charges on said capacitors.

6. The invention as set forth in claim 1 wherein said receiver is of the superheterodyne type, having a predetermined I.-F. frequency, and said reversing switches are arranged to operate at a frequency below the lower limit of said audio response characteristic of said receiver, and said beat frequency oscillator is arranged to operate at a frequency differing from said I.-F. frequency of said receiver by a frequency within the audio response band of said receiver.

7. A left-right indicator convertor for a radio direction finder which includes a directive antenna and a radio receiver including audio amplifier means having a predetermined low cutoff frequency, said convertor comprising a reversing switch connected to said directive antenna and connected to the input circuit of said radio receiver, a beat frequency oscillator connected to said receiver, a rectifier connected to the output circuit of said receiver, a second reversing switch connected to the output circuit of said rectifier, indicator means connected to said second switch, and a motor arranged to operate said switches in synchronism at a frequency lower than said cut off frequency.

8. The invention as set forth in claim 7, including an auxiliary switch connected to said directive antenna and connected to the input circuit of said receiver, a motor control switch in the power input circuit of said motor, and a mechanical connection between said two last mentioned switches so arranged that when said motor control switch is opened, said antenna is connected through said auxiliary switch to said receiver.

EDWARD D. BLODGETT.

REFERENCES CITED

The following references are of record in the file of this patent:

UNITED STATES PATENTS

| Number | Name | Date |
| --- | --- | --- |
| 2,256,619 | Luck | Sept. 23, 1941 |
| 2,275,296 | Hagen | Mar. 3, 1942 |
| 2,218,361 | Runge et al. | Oct. 15, 1940 |

FOREIGN PATENTS

| Number | Country | Date |
| --- | --- | --- |
| 460,271 | Germany | May 21, 1928 |
| 542,427 | Germany | Jan. 23, 1932 |